(12) United States Patent
Kusachi et al.

(10) Patent No.: US 10,749,634 B2
(45) Date of Patent: Aug. 18, 2020

(54) TRANSMISSION DEVICE, TRANSMISSION RECEPTION SYSTEM AND CONTROL METHOD FOR TRANSMISSION RECEPTION SYSTEM

(71) Applicant: FUJITSU LIMITED, Kawasaki-shi, Kanagawa (JP)

(72) Inventors: Souta Kusachi, Yokohama (JP); Jouji Kunii, Kawasaki (JP); Yuichiro Ajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 16/112,010

(22) Filed: Aug. 24, 2018

(65) Prior Publication Data
US 2019/0068329 A1 Feb. 28, 2019

(30) Foreign Application Priority Data
Aug. 28, 2017 (JP) ................. 2017-163337

(51) Int. Cl.
*H04L 1/00* (2006.01)
*H04L 1/20* (2006.01)

(52) U.S. Cl.
CPC ............ *H04L 1/0083* (2013.01); *H04L 1/009* (2013.01); *H04L 1/0091* (2013.01); *H04L 1/203* (2013.01)

(58) Field of Classification Search
CPC ..... H04L 1/0083; H04L 1/009; H04L 1/0091; H04L 1/203; H04L 5/0044; H04L 5/0053; H04L 5/0023; H04L 27/263; H04L 27/2627; H04L 5/0007; H04L 1/0041; H04L 1/0045; H04L 1/0061; H04L 1/08; H04L 1/0005; H04L 1/0035; H04L 1/0026; H04L 1/1671; H04L 1/1692; H04L 1/1812; H04L 1/20; H04L 1/0003; H04L 5/0048; H04L 5/0055; H04L 5/0057; H04L 1/0021; H04L 1/0028; H04L 1/0011; H04L 1/0065; H04L 1/0071; H04L 5/06; H04L 27/2602; H04L 1/0057; H04B 7/0628; H04B 7/086; H04B 7/088; H04B 7/0408; H04B 7/12;
(Continued)

(56) References Cited

U.S. PATENT DOCUMENTS

2005/0058089 A1* 3/2005 Vijayan .................... H04B 7/12
370/312
2011/0283168 A1* 11/2011 Chen ................. H03M 13/2707
714/782
(Continued)

FOREIGN PATENT DOCUMENTS

| JP | 2004-32283 | 1/2004 |
|---|---|---|
| JP | 2010-118894 | 5/2010 |

*Primary Examiner* — Hardikkumar D Patel
(74) *Attorney, Agent, or Firm* — Fujitsu Patent Center

(57) ABSTRACT

A transmission device includes, a receiver that receives availability information of each of a plurality of first transmission paths, and a transmitter that divides data into a plurality of transmission blocks, groups the plurality of transmission blocks into a plurality of slices, each of the plurality of slices include a distinct subset of the plurality of transmission blocks, when the availability information indicates that each of the plurality of first transmission paths has an error occurrence below a threshold value, transmits a different one of the plurality of slices to each of the plurality of first transmission paths.

15 Claims, 6 Drawing Sheets

(58) Field of Classification Search
CPC . H04W 88/08; H04W 92/16; H04W 72/0446; H04W 52/0209; H04N 21/2383; H04N 21/4382; H04N 21/6112; H03M 13/2707; H03M 13/2906; H03M 13/373
See application file for complete search history.

(56) References Cited

U.S. PATENT DOCUMENTS

| | | | |
|---|---|---|---|
| 2012/0014347 A1* | 1/2012 | Tanaka | H04L 1/0007 370/329 |
| 2014/0108894 A1* | 4/2014 | Hirano | G06F 11/10 714/776 |
| 2017/0180076 A1* | 6/2017 | Finlow-Bates | H04L 1/0041 |

* cited by examiner

FIG. 2

| PATTERN | NUMBER OF TIMES BEING DISTRIBUTED | LN0 | LN1 | LN2 | LN3 |
|---|---|---|---|---|---|
| 0 | 4 | SL0 | SL1 | SL2 | SL3 |
| 1 | 3 | SL0 | SL0 | SL1 | SL2 |
| 2 | 3 | SL0 | SL1 | SL2 | SL2 |
| 3 | — | | | | |
| 4 | — | | | | |
| 5 | 2 | SL0 | SL1 | SL0 | SL1 |
| 6 | 2 | SL0 | SL0 | SL1 | SL1 |
| 7 | 1 | SL0 | SL0 | SL0 | SL0 |

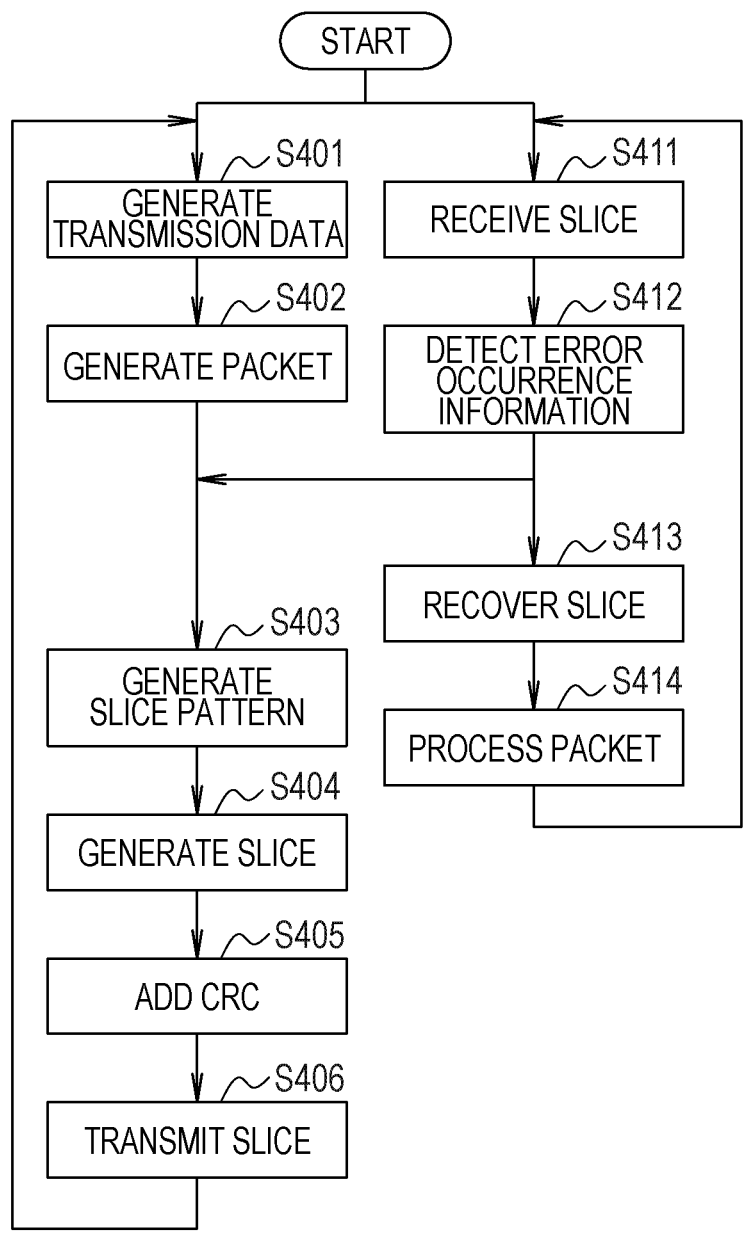

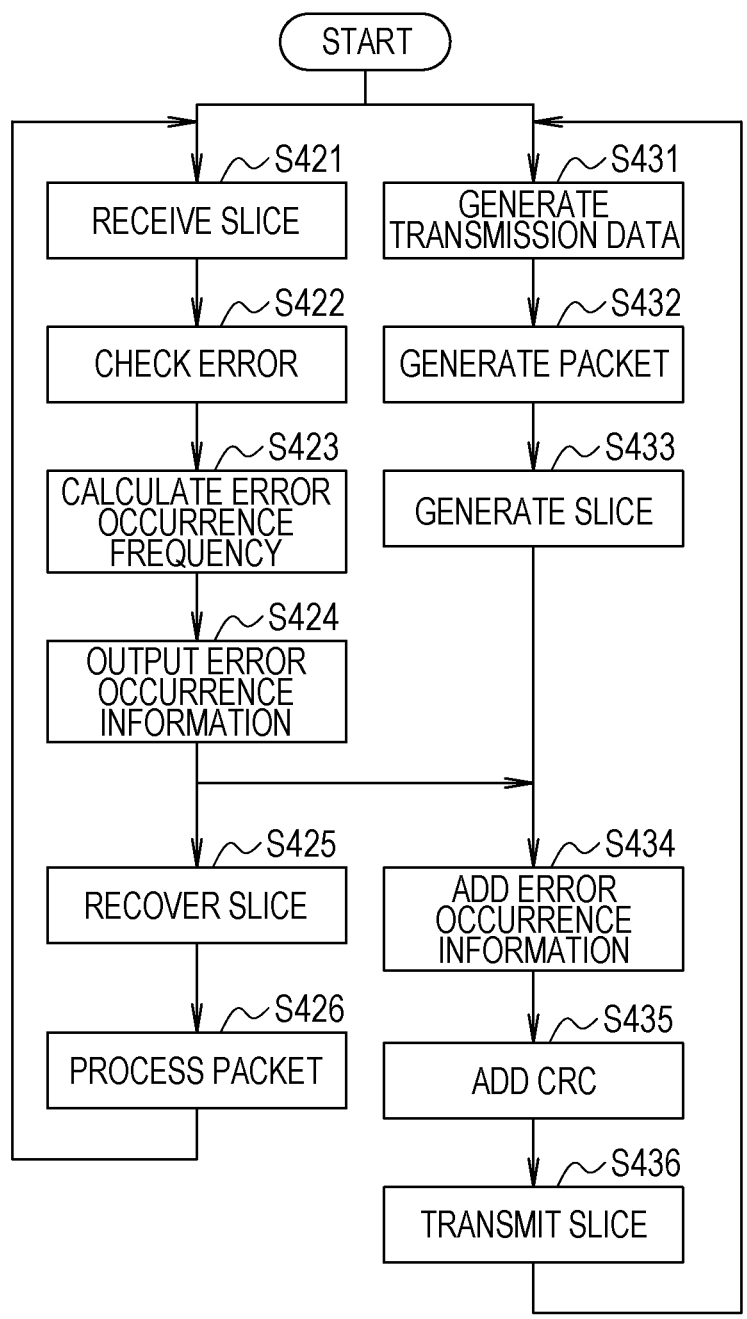

TRANSMISSION DEVICE, TRANSMISSION RECEPTION SYSTEM AND CONTROL METHOD FOR TRANSMISSION RECEPTION SYSTEM

CROSS-REFERENCE TO RELATED APPLICATION

This application is based upon and claims the benefit of priority of the prior Japanese Patent Application No. 2017-163337, filed on Aug. 28, 2017, the entire contents of which are incorporated herein by reference.

FIELD

The embodiments discussed herein are related to a transmission device, a transmission reception system and a control method for the transmission reception system.

BACKGROUND

A reception device which monitors a reception status of a transmission packet and returns the reception status to a transmission device and the transmission device which generates the transmission packet having error resilience according to a state of a transmission path and reduces a processing load of the reception device, are known (see Japanese Laid-open Patent Publication No. 2004-32283). The reception device includes a reception buffer circuit, an error determining circuit, a data packet sending circuit, an error location specifying circuit, an error correction circuit, and a transmission packet monitoring circuit. The transmission packet monitoring circuit monitors the reception buffer circuit and the error determining circuit, obtains a reception interval of the transmission packet, the number of discarded packets, a throughput, and the like, and transmits an obtained result to the transmission device. In addition, the transmission device includes a framing circuit, a packet dividing circuit, a packet generating circuit, and a transmission parameter determining circuit. The transmission parameter determining circuit determines an interleaving length and a payload length based on information from the reception device.

Further, a packet generating device which generates a packet configured to include a data unit including transmission data and error detection information, is known (see Japanese Laid-open Patent Publication No. 2010-118894). An error occurrence status monitoring circuit monitors an error occurrence status in a data unit by using a transmission result returned from a reception side with respect to the transmitted packet. A unit size calculation circuit calculates an error occurrence probability by using the error occurrence status. Then, the unit size calculation circuit calculates the number of times of dividing the transmission data included in the packet as the number of correction data units based on a correlation between the error occurrence probability, the number of data units, and an overhead within a range of the same packet length. A packet generating circuit generates the packet by using data to be transmitted and the number of correction data units.

In Japanese Laid-open Patent Publication No. 2004-32283, the reception device monitors the reception status of the transmission packet and returns the transmission status to the transmission device, and the transmission device generates the transmission packet having error resilience according to the state of the transmission path and reduces the processing load of the reception device. However, the reception status of the reception device is unchanged and is not improved.

SUMMARY

According to an aspect of the embodiments, a transmission device includes, a receiver that receives availability information of each of a plurality of first transmission paths, and a transmitter that divides data into a plurality of transmission blocks, groups the plurality of transmission blocks into a plurality of slices, each of the plurality of slices include a distinct subset of the plurality of transmission blocks, when the availability information indicates that each of the plurality of first transmission paths has an error occurrence below a threshold value, transmits a different one of the plurality of slices to each of the plurality of first transmission paths, and when the availability information indicates that one of the plurality of first transmission paths has an error occurrence above the threshold value, transmits at least one of the same plurality of slices to both the plurality of first transmission path that has an error occurrence above the threshold value and one of the plurality of first transmission paths that has an error occurrence below the threshold value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a slice pattern;

FIGS. 4A and 4B are flowcharts illustrating a control method of the transmission reception system.

DESCRIPTION OF EMBODIMENTS

First Embodiment

Figure 1:
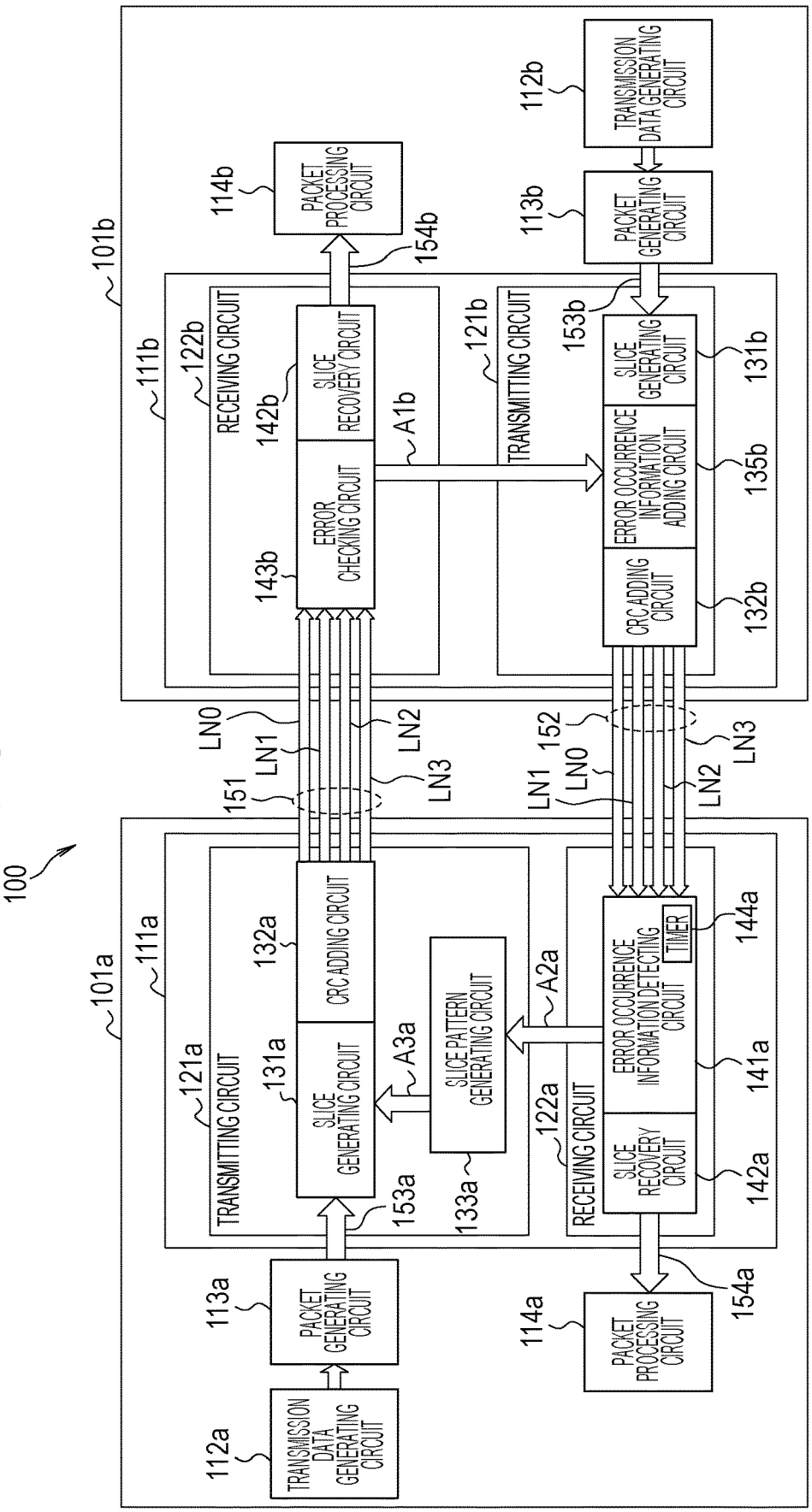
FIG. 1 is a diagram illustrating a configuration example of a transmission reception system according to a first embodiment.

FIG. 1 is a diagram illustrating a configuration example of a transmission reception system 100 according to a first embodiment. The transmission reception system 100 includes a semiconductor chip 101a, a semiconductor chip 101b, a plurality of lanes LN0 to LN3 of a lane unit 151, and a plurality of lanes LN0 to LN3 of a lane unit 152. The plurality of lanes LN0 to LN3 of the lane unit 151 are, for example, optical cables or electric wires and are a plurality of transmission paths for transmitting a packet from the semiconductor chip 101a to the semiconductor chip 101b. The plurality of lanes LN0 to LN3 of the lane unit 152 are, for example, optical cables or electric wires and are the plurality of transmission paths for transmitting a packet from the semiconductor chip 101b to the semiconductor chip 101a. The semiconductor chip 101b receives the packet from the semiconductor chip 101a via the plurality of lanes LN0 to LN3 of the lane unit 151 and transmits the packet to the semiconductor chip 101a via the plurality of lanes LN0 to LN3 of the lane unit 152.

The semiconductor chip 101a is, for example, a transmission device and includes a port 111a, a transmission data generating circuit 112a, a packet generating circuit 113a, and a packet processing circuit 114a. The port 111a includes a transmitting circuit 121a and a receiving circuit 122a. The transmitting circuit 121a includes a slice generating circuit 131a, a cyclic redundancy check (CRC) adding circuit 132a, and a slice pattern generating circuit 133a. The receiving circuit 122a includes an error occurrence information detecting circuit 141a and a slice recovery circuit 142a. The error occurrence information detecting circuit 141a includes a timer 144a.

The semiconductor chip 101b is, for example, a transmission device and includes a port 111b, a transmission data generating circuit 112b, a packet generating circuit 113b, and a packet processing circuit 114b. The port 111b includes a transmitting circuit 121b and a receiving circuit 122b. The receiving circuit 122b includes an error checking circuit 143b and a slice recovery circuit 142b. The transmitting circuit 121b includes a slice generating circuit 131b, an error occurrence information adding circuit 135b, and a CRC adding circuit 132b.

First, a transmission method of the semiconductor chip 101a will be described. The transmission data generating circuit 112a generates transmission data and outputs the generated transmission data to the packet generating circuit 113a. The packet generating circuit 113a is a packet output circuit, and generates a packet 153a having a predetermined packet length based on the transmission data and outputs the generated packet 153a to the transmitting circuit 121a. In addition, the packet generating circuit 113a regularly generates the data link layer packet (DLLP) 153a and outputs the generated data link layer packet 153a to the transmitting circuit 121a. The data link layer packet is a packet for notifying that a link between the semiconductor chips 101a and 101b is established. The slice generating circuit 131a divides the packet (data) 153a into a plurality of transmission blocks and distributes the plurality of transmission blocks to the plurality of lanes LN0 to LN3 of the lane unit 151. A method distributing the plurality of transmission blocks will be described below with reference to FIGS. 3A to 3C. The CRC adding circuit 132a adds CRC information (error checking information) to the plurality of transmission blocks distributed to the plurality of lanes LN0 to LN3 of the lane unit 151 for each of the plurality of lanes LN0 to LN3 of the lane unit 151. The transmitting circuit 121a transmits the plurality of transmission blocks to which the CRC information is added, to the semiconductor chip 101b via the plurality of lanes LN0 to LN3 of the lane unit 151.

Next, a reception method of the semiconductor chip 101b will be described. The receiving circuit 122b receives a plurality of reception blocks to which the CRC information is added, from the semiconductor chip 101a via the plurality of lanes LN0 to LN3 of the lane unit 151. The error checking circuit 143b calculates an error occurrence frequency (bit error rate) of each of the plurality of lanes LN0 to LN3 of the lane unit 151 based on the CRC information, for each of the plurality of lanes LN0 to LN3 of the lane unit 151. Then, the error checking circuit 143b generates error occurrence information A1b of the plurality of lanes LN0 to LN3 of the lane unit 151 based on the error occurrence frequency of each of the plurality of lanes LN0 to LN3 of the lane unit 151 and outputs the error occurrence information A1b to the error occurrence information adding circuit 135b. For example, in a case where the lane unit 151 includes the four lanes LN0 to LN3, the error occurrence information A1b has 4 bits corresponding to the four lanes LN0 to LN3 of the lane unit 151. The error checking circuit 143b compares the error occurrence frequency of each of the four lanes LN0 to LN3 of the lane unit 151 and a threshold value and sets the bit of the error occurrence information A1b corresponding to the lane having the error occurrence frequency smaller than the threshold value, to "0". Then, the error checking circuit 143b sets the bit of the error occurrence information A1b corresponding to the lane having the error occurrence frequency equal to or larger than the threshold value, to "1". That is, the error occurrence information A1b is availability information on each of the plurality of lanes LN0 to LN3 of the lane unit 151. The bit of "0" in the error occurrence information A1b indicates that the lane corresponding to the bit may be used. The bit of "1" in the error occurrence information A1b indicates that the lane corresponding to the bit may not be used. The slice recovery circuit 142b recovers the packet (data) 154b by combining the received plurality of reception blocks and outputs the packet 154b to the packet processing circuit 114b. The packet processing circuit 114b performs a process on the packet 154b.

Next, a transmission method of the semiconductor chip 101b will be described. The transmission data generating circuit 112b generates transmission data and outputs the generated transmission data to the packet generating circuit 113b. The packet generating circuit 113b is a packet output circuit, and generates a packet 153b having a predetermined packet length based on the transmission data and outputs the generated packet 153b to the transmitting circuit 121b. In addition, the packet generating circuit 113b regularly generates the data link layer packet (DLLP) 153b and outputs the generated data link layer packet 153b to the transmitting circuit 121b. The slice generating circuit 131b divides the packet 153b into a plurality of transmission blocks and distributes the plurality of transmission blocks to the plurality of lanes LN0 to LN3 of the lane unit 152. The error occurrence information adding circuit 135b adds the same error occurrence information A1b of 4 bits to the plurality of transmission blocks distributed to the plurality of lanes LN0 to LN3 of the lane unit 152 for each of the plurality of lanes LN0 to LN3 of the lane unit 152. The CRC adding circuit 132b adds the CRC information to the plurality of transmission blocks distributed to the plurality of lanes LN0 to LN3 of the lane unit 152 for each of the plurality of lanes LN0 to LN3 of the lane unit 152. The transmitting circuit 121b transmits the plurality of transmission blocks to which the error occurrence information A1b and the CRC information are added, to the semiconductor chip 101a via the plurality of lanes LN0 to LN3 of the lane unit 152.

Next, a reception method of the semiconductor chip 101a will be described. The receiving circuit 122a receives a plurality of reception blocks to which the error occurrence information A1b and the CRC information are added, from the semiconductor chip 101b via the plurality of lanes LN0 to LN3 of the lane unit 152. The error occurrence information detecting circuit 141a detects the received error occurrence information A1b and outputs the detected error occurrence information A1b to the slice pattern generating circuit 133a as error occurrence information A2a. The slice recovery circuit 142a recovers a packet 154a by combining the received plurality of reception blocks and outputs the packet 154a to the packet processing circuit 114a. The packet processing circuit 114a performs a process on the packet 154a.

Figure 3A:
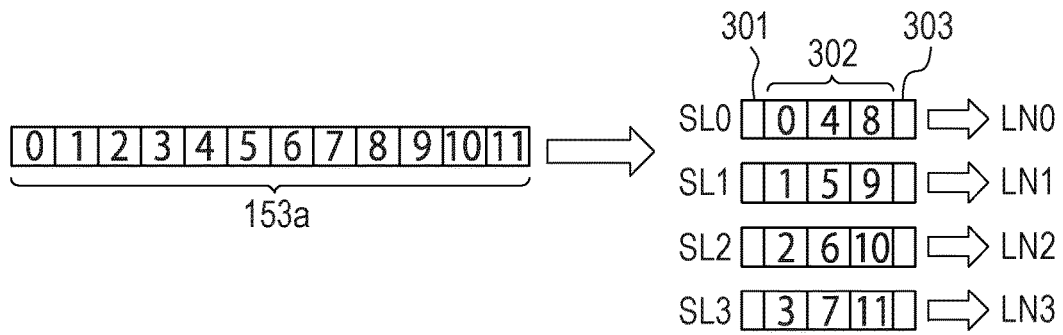
FIGS. 3A to 3C are diagrams illustrating a method of dividing a packet into a plurality of transmission blocks and distributing the plurality of transmission blocks to a plurality of lanes.

Next, a transmission method of the semiconductor chip 101a will be described. The slice pattern generating circuit 133a selects one slice pattern among six slice patterns illustrated in FIG. 2 based on the error occurrence information A2a of 4 bits and outputs a selected slice pattern number A3a. The slice pattern number A3a, illustrated in FIG. 2, is represented by 3 bits and is information indicating a method of distributing the plurality of transmission blocks to the lanes LN0 to LN3. In a case where all of the bits of the error occurrence information A2a of 4 bits are set to "0", the slice pattern generating circuit 133a selects the slice pattern 0. In this case, as illustrated in FIG. 3A, the slice generating circuit 131a divides the packet 153a into the plurality (for example, 12 blocks) of transmission blocks and distributes the plurality of transmission blocks to the four lanes LN0 to LN3 of the lane unit 151 as a slice 302. The slice 302 including the transmission blocks 0, 4, and 8 is distributed to the lane LN0. The slice 302 including the transmission blocks 1, 5, and 9 is distributed to the lane LN1. The slice 302 including the transmission blocks 2, 6, and 10 is distributed to the lane LN2. The slice 302 including the transmission blocks 3, 7, and 11 is distributed to the lane LN3. The slice generating circuit 131a adds the slice pattern number A3a of number 0 to a header 301 at a head of the slice 302 for each of the four lanes LN0 to LN3 of the lane unit 151. The CRC adding circuit 132a adds CRC information 303 to an end of the slice 302 of each of the four lanes LN0 to LN3 of the lane unit 151. The CRC information 303 is error checking information for checking an error of the header 301 and the slice 302 of each of the lanes LN0 to LN3. The transmitting circuit 121a transmits the slice 302 to which the header 301 and the CRC information 303 are added, to each of the four lanes LN0 to LN3 of the lane unit 151. Since the error occurrence information A2a indicates that all of the lanes LN0 to LN3 of the lane unit 151 are usable, there is a high possibility that the receiving circuit 122b may receive the transmission blocks 0 to 11 without receiving an error from all of the lanes LN0 to LN3 of the lane unit 151.

Figure 3B:
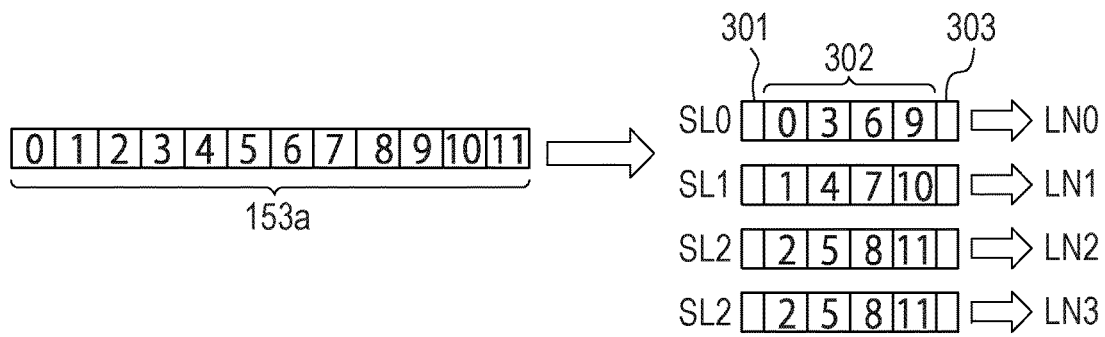

In addition, in a case where only the bit of the lane LN2 of the lane unit 151 among the bits of the error occurrence information A2a of 4 bits is "1" or in a case where only the bit of the lane LN3 of the lane unit 151 among the bits of the error occurrence information A2a of 4 bits is "1", the slice pattern generating circuit 133a selects the slice pattern 2 in FIG. 2. In this case, as illustrated in FIG. 3B, the slice generating circuit 131a divides the packet 153a into the plurality (for example, 12 blocks) of transmission blocks, distributes the plurality of transmission blocks to the three lanes LN0 to LN2 of the lane unit 151 as a slice 302, and distributes the same slice 302 as the lane LN2 of the lane unit 151 to the lane LN3 of the lane unit 151. The slice 302 including the transmission blocks 0, 3, 6, and 9 is distributed to the lane LN0. The slice 302 including the transmission blocks 1, 4, 7, and 10 is distributed to the lane LN1. The slice 302 including the transmission blocks 2, 5, 8, and 11 is distributed to the lane LN2. The slice 302 including the transmission blocks 2, 5, 8, and 11 is distributed to the lane LN3. The slice generating circuit 131a adds the slice pattern number A3a of number 2 to a header 301 at the head of the slice 302 for each of the four lanes LN0 to LN3 of the lane unit 151. The CRC adding circuit 132a adds CRC information 303 to the end of the slice 302 of each of the four lanes LN0 to LN3 of the lane unit 151. Since the error occurrence information A2a indicates that the lanes LN0 to LN2 of the lane unit 151 are usable or the lanes LN0, LN1, and LN3 of the lane unit 151 are usable, there is a high possibility that the receiving circuit 122b may receive the transmission blocks 0 to 11 without receiving an error from the lane unit 151.

In the same manner, in a case where only the bit of the lane LN0 of the lane unit 151 among the bits of the error occurrence information A2a of 4 bits is "1" or in a case where only the bit of the lane LN1 of the lane unit 151 among the bits of the error occurrence information A2a of 4 bits is "1", the slice pattern generating circuit 133a selects the slice pattern 1 in FIG. 2. In this case, not illustrated, the slice generating circuit 131a divides the packet 153a into the plurality (for example, 12 blocks) of transmission blocks, distributes the plurality of transmission blocks to the three lanes LN1 to LN3 of the lane unit 151 as the slice 302, and distributes the same slice 302 as the lane LN1 of the lane unit 151 to the lane LN0 of the lane unit 151. The slice generating circuit 131a adds the slice pattern number A3a of number 1 to a header 301 at the head of the slice 302 for each of the four lanes LN0 to LN3 of the lane unit 151. Since the error occurrence information A2a indicates that the lanes LN1 to LN3 of the lane unit 151 are usable or the lanes LN0, LN2, and LN3 of the lane unit 151 are usable, there is a high possibility that the receiving circuit 122b may receive the transmission blocks 0 to 11 without receiving an error from the lane unit 151.

Figure 3C:
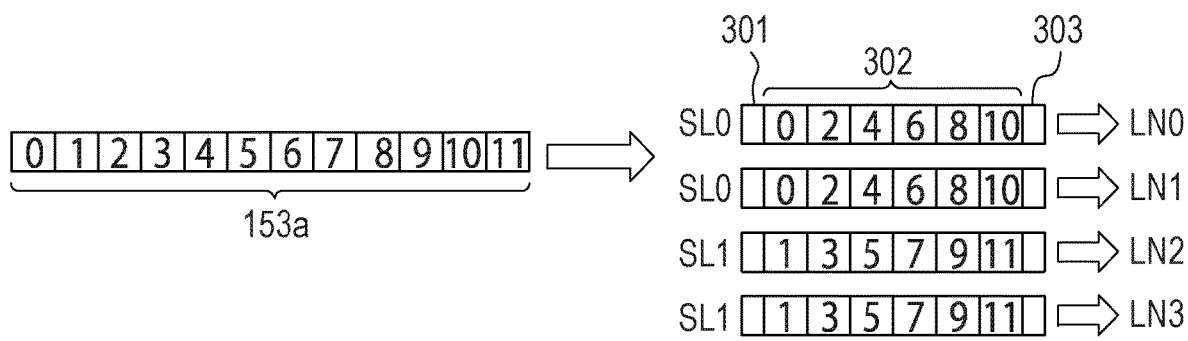

In addition, in a case where only the bits of the lanes LN0 and LN3 of the lane unit 151 among the bits of the error occurrence information A2a of 4 bits are "1", in a case where only the bits of the lanes LN1 and LN2 of the lane unit 151 among the bits of the error occurrence information A2a of 4 bits are "1", in a case where only the bits of the lanes LN0 and LN2 of the lane unit 151 among the bits of the error occurrence information A2a of 4 bits are "1", or in a case where only the bits of the lanes LN1 and LN3 of the lane unit 151 among the bits of the error occurrence information A2a of 4 bits are "1", the slice pattern generating circuit 133a selects the slice pattern 6 in FIG. 2. In this case, as illustrated in FIG. 3C, the slice generating circuit 131a divides the packet 153a into the plurality (for example, 12 blocks) of transmission blocks and distributes the plurality of transmission blocks to the two lanes LN1 and LN2 of the lane unit 151 as the slice 302. Then, the slice generating circuit 131a distributes the same slice 302 as the lane LN1 of the lane unit 151 to the lane LN0 of the lane unit 151 and distributes the same slice 302 as the lane LN2 of the lane unit 151 to the lane LN3 of the lane unit 151. The slice 302 including the transmission blocks 0, 2, 4, 6, 8, and 10 is distributed to the lane LN0. The slice 302 including the transmission blocks 0, 2, 4, 6, 8, and 10 is distributed to the lane LN1. The slice 302 including the transmission blocks 1, 3, 5, 7, 9, and 11 is distributed to the lane LN2. The slice 302 including the transmission blocks 1, 3, 5, 7, 9, and 11 is distributed to the lane LN3. The slice generating circuit 131a adds the slice pattern number A3a of number 6 to a header 301 at the head of the slice 302 for each of the four lanes LN0 to LN3 of the lane unit 151. The CRC adding circuit 132a adds CRC information 303 to the end of the slice 302 of each of the four lanes LN0 to LN3 of the lane unit 151. Since the error occurrence information A2a indicates that the lanes LN1 and LN2 of the lane unit 151 are usable, the lanes LN0 and LN3 of the lane unit 151 are usable, the lanes LN1 and LN3 of the lane unit 151 are usable, or the lanes LN0 and LN2 of the lane unit 151 are usable, there is a high possibility that the receiving circuit 122*b* may receive the transmission blocks 0 to 11 without receiving an error from the lane unit 151.

In the same manner, in a case where only the bits of the lanes LN2 and LN3 of the lane unit 151 among the bits of the error occurrence information A2*a* of 4 bits are "1", in a case where only the bits of the lanes LN0 and LN1 of the lane unit 151 among the bits of the error occurrence information A2*a* of 4 bits are "1", in a case where only the bits of the lanes LN0 and LN3 of the lane unit 151 among the bits of the error occurrence information A2*a* of 4 bits are "1", or in a case where only the bits of the lanes LN1 and LN2 of the lane unit 151 among the bits of the error occurrence information A2*a* of 4 bits are "1", the slice pattern generating circuit 133*a* selects the slice pattern 5 in FIG. 2. In this case, not illustrated, the slice generating circuit 131*a* divides the packet 153*a* into the plurality (for example, 12 blocks) of transmission blocks and distributes the plurality of transmission blocks to the two lanes LN0 and LN1 of the lane unit 151 as the slice 302. Then, the slice generating circuit 131*a* distributes the same slice 302 as the lane LN0 of the lane unit 151 to the lane LN2 of the lane unit 151 and distributes the same slice 302 as the lane LN1 of the lane unit 151 to the lane LN3 of the lane unit 151. The slice generating circuit 131*a* adds the slice pattern number A3*a* of number 5 to a header 301 at the head of the slice 302 for each of the four lanes LN0 to LN3 of the lane unit 151. Since the error occurrence information A2*a* indicates that the lanes LN0 and LN1 of the lane unit 151 are usable, the lanes LN2 and LN3 of the lane unit 151 are usable, the lanes LN1 and LN2 of the lane unit 151 are usable, or the lanes LN0 and LN3 of the lane unit 151 are usable, there is a high possibility that the receiving circuit 122*b* may receive the transmission blocks 0 to 11 without receiving an error from the lane unit 151.

In the same manner, in a case where the 3 bits among the error occurrence information A2*a* of 4 bits are set to "1", the slice pattern generating circuit 133*a* selects the slice pattern 7 in FIG. 2. In this case, not illustrated, the slice generating circuit 131*a* divides the packet 153*a* into the plurality (for example, 12 blocks) of transmission blocks and distributes the plurality of transmission blocks to the one lane LN0 of the lane unit 151 as the slice 302. Then, the slice generating circuit 131*a* distributes the same slice 302 as the lane LN0 of the lane unit 151 to each of the lanes LN1 to LN3 of the lane unit 151. The slice generating circuit 131*a* adds the slice pattern number A3*a* of number 7 to a header 301 at the head of the slice 302 for each of the four lanes LN0 to LN3 of the lane unit 151.

FIG. 4A is a flowchart illustrating a control method of the semiconductor chip 101*a*. The semiconductor chip 101*a* performs transmission processes in steps S401 to S406 and reception processes in steps S411 to S414 in parallel.

First, the transmission process will be described. In step S401, the transmission data generating circuit 112*a* generates the transmission data and outputs the generated transmission data to the packet generating circuit 113*a*. Next, in step S402, the packet generating circuit 113*a* generates the packet 153*a* having a predetermined packet length based on the transmission data and outputs the generated packet 153*a* to the transmitting circuit 121*a*. In addition, the packet generating circuit 113*a* regularly generates the data link layer packet (DLLP) 153*a* and outputs the generated data link layer packet 153*a* to the transmitting circuit 121*a*.

Next, in step S403, the slice pattern generating circuit 133*a* selects one slice pattern among six slice patterns illustrated in FIG. 2 based on the error occurrence information A2*a* of 4 bits output by the error occurrence information detecting circuit 141*a* and outputs the selected slice pattern number A3*a*.

Next, in step S404, the slice generating circuit 131*a* divides the packet 153*a* into the plurality of transmission blocks and distributes the plurality of transmission blocks to the lanes LN0 to LN3 of the lane unit 151 as the slice 302 based on the slice pattern number A3*a*. Specifically, among the plurality of lanes LN0 to LN3 of the lane unit 151, the slice generating circuit 131*a* distributes the plurality of transmission blocks to the lane having the bit of the error occurrence information A2*a* of "0" and distributes the same transmission block as the transmission distributed to the lane having the bit of the error occurrence information A2*a* of "0", to the lane having the bit of the error occurrence information A2*a* of "1". The slice generating circuit 131*a* adds the slice pattern number A3*a* to the header 301 at the head of the slice 302 for each of the four lanes LN0 to LN3 of the lane unit 151.

Next, in step S405, the CRC adding circuit 132*a* adds the CRC information 303 to the end of the slice 302 of each of the four lanes LN0 to LN3 of the lane unit 151. Next, in step S406, the transmitting circuit 121*a* transmits the slice 302 to which the header 301 and the CRC information 303 are added, to the semiconductor chip 101*b* via the plurality of lanes LN0 to LN3 of the lane unit 151. After that, the semiconductor chip 101*a* returns to step S401.

Next, the reception process will be described. In step S411, the receiving circuit 122*a* receives the slice 302 to which the header 301 and the CRC information 303 are added, from the semiconductor chip 101*b* via the plurality of lanes LN0 to LN3 of the lane unit 152 in the same manner as FIG. 3A. The header 301 includes the error occurrence information A1*b* added by the error occurrence information adding circuit 135*b*.

Next, in step S412, the error occurrence information detecting circuit 141*a* detects the error occurrence information A1*b* in the received header 301 and outputs the detected error occurrence information A1*b* to the slice pattern generating circuit 133*a* as the error occurrence information A2*a*.

Next, in step S413, the slice recovery circuit 142*a* recovers a packet 154*a* by combining the plurality of reception blocks in the received slice 302 and outputs the packet 154*a* to the packet processing circuit 114*a*. Next, in step S414, the packet processing circuit 114*a* performs the process on the packet 154*a*. After that, the semiconductor chip 101*a* returns to step S411.

FIG. 4B is a flowchart illustrating a control method of the semiconductor chip 101*b*. The semiconductor chip 101*b* performs transmission processes in steps S421 to S426 and reception processes in steps S431 to S436 in parallel.

First, the reception process will be described. In step S421, the receiving circuit 122*b* receives the slice 302 to which the header 301 and the CRC information 303 are added, from the semiconductor chip 101*a* via the plurality of lanes LN0 to LN3 of the lane unit 151.

Next, in step S422, the error checking circuit 143*b* checks an error of the header 301 and the slice 302 of each of the plurality of lanes LN0 to LN3 of the lane unit 151 based on the CRC information 303, for each of the plurality of lanes LN0 to LN3 of the lane unit 151.

Next, in step S423, the error checking circuit 143*b* calculates the error occurrence frequency (bit error rate) of the header 301 and the slice 302 of each of the plurality of lanes LN0 to LN3 of the lane unit 151, for each of the plurality of lanes LN0 to LN3 of the lane unit 151.

Next, in step S424, the error checking circuit 143*b* generates error occurrence information A1*b* of the plurality of lanes LN0 to LN3 of the lane unit 151 based on the error occurrence frequency of each of the plurality of lanes LN0 to LN3 of the lane unit 151 and outputs the error occurrence information A1*b* of 4 bits to the error occurrence information adding circuit 135*b*. The bit of "0" in the error occurrence information A1*b* indicates that the lane corresponding to the bit may be used. The bit of "1" in the error occurrence information A1*b* indicates that the lane corresponding to the bit may not be used.

Next, in step S425, the slice recovery circuit 142*b* recovers the packet 154*b* by combining the plurality of reception blocks in the received slice 302 based on the slice pattern number A3*a* in the received header 301 and outputs the packet 154*b* to the packet processing circuit 114*b*. Next, in step S426, the packet processing circuit 114*b* performs the process on the packet 154*b*. After that, the semiconductor chip 101*b* returns to step S421.

Next, the transmission process will be described. In step S431, the transmission data generating circuit 112*b* generates the transmission data and outputs the generated transmission data to the packet generating circuit 113*b*.

Next, in step S432, the packet generating circuit 113*b* generates the packet 153*b* having a predetermined packet length based on the transmission data and outputs the generated packet 153*b* to the transmitting circuit 121*b*. In addition, the packet generating circuit 113*b* regularly generates the data link layer packet (DLLP) 153*b* and outputs the generated data link layer packet 153*b* to the transmitting circuit 121*b*.

Next, in step S433, in the same manner as FIG. 3A, the slice generating circuit 131*b* divides the packet 153*b* into the plurality of transmission blocks and distributes the plurality of transmission blocks to the lanes LN0 to LN3 of the lane unit 152 as the slice 302.

Next, in step S434, in the same manner as FIG. 3A, the error occurrence information adding circuit 135*b* adds the error occurrence information A1*b* to the header 301 at the head of the slice 302 for each of the four lanes LN0 to LN3 of the lane unit 152.

Next, in step S435, in the same manner as FIG. 3A, the CRC adding circuit 132*a* adds the CRC information 303 to the end of the slice 302 of each of the four lanes LN0 to LN3 of the lane unit 152.

Next, in step S436, the transmitting circuit 121*b* transmits the slice 302 to which the header 301 and the CRC information 303 are added, to the semiconductor chip 101*a* via the plurality of lanes LN0 to LN3 of the lane unit 152. After that, the semiconductor chip 101*b* returns to step S431.

Next, a case where the receiving circuit 122*a* may not receive the error occurrence information A1*b* in the header 301 due to a transmission error of all of the lanes LN0 to LN3 of the lane unit 152 will be described. In this case, the error occurrence information detecting circuit 141*a* does not detect the error occurrence information A1*b* of the lanes LN0 to LN3 of the lane unit 151 and the slice pattern generating circuit 133*a* may not select the slice pattern number A3*a*. The semiconductor chip 101*a* does not know whether or not the semiconductor chip 101*b* receives the slice 302 without the error.

Here, the packet generating circuit 113*b* regularly outputs the data link layer packet (DLLP) to the transmitting circuit 121*b*. Therefore, if the lane unit 152 has the transmission error, the receiving circuit 122*a* regularly receives the slice 302 to which the header 301 and the CRC information 303 corresponding to the data link layer packet are added. The error occurrence information detecting circuit 141*a* measures an interval at which the receiving circuit 122*a* receives the packet from the plurality of lanes LN0 to LN3 of the lane unit 152, by the timer 144*a*. In a case where the interval at which the receiving circuit 122*a* receives the packet from the plurality of lanes LN0 to LN3 of the lane unit 152, is equal to or larger than a threshold value, the error occurrence information detecting circuit 141*a* notifies the slice pattern generating circuit 133*a* that the error occurrence information may not be detected. Then, the slice pattern generating circuit 133*a* decreases the currently selected slice pattern number A3*a* in order. Specifically, as illustrated in FIG. 2, the slice pattern generating circuit 133*a* changes the slice pattern number A3*a* in order of 0→1→2→5→6→7. That is, in a case where the interval at which the receiving circuit 122*a* receives the packet from the plurality of lanes LN0 to LN3 of the lane unit 152, is equal to or larger than the threshold value, the slice pattern generating circuit 133*a* changes the slice pattern number A3*a* so as to increase the number of the lanes which receive the same slice 302 as the other lanes among the plurality of lanes LN0 to LN3 of the lane unit 151.

In a case where the lane unit 151 has a transmission error, the receiving circuit 122*b* may not normally receive all of the reception blocks without the error. In this case, as described above, since the slice pattern generating circuit 133*a* changes the slice pattern number A3*a*, there is a high possibility that the receiving circuit 122*b* may normally receive all of the reception blocks and it is possible to recover the packet.

Second Embodiment

Figure 5:
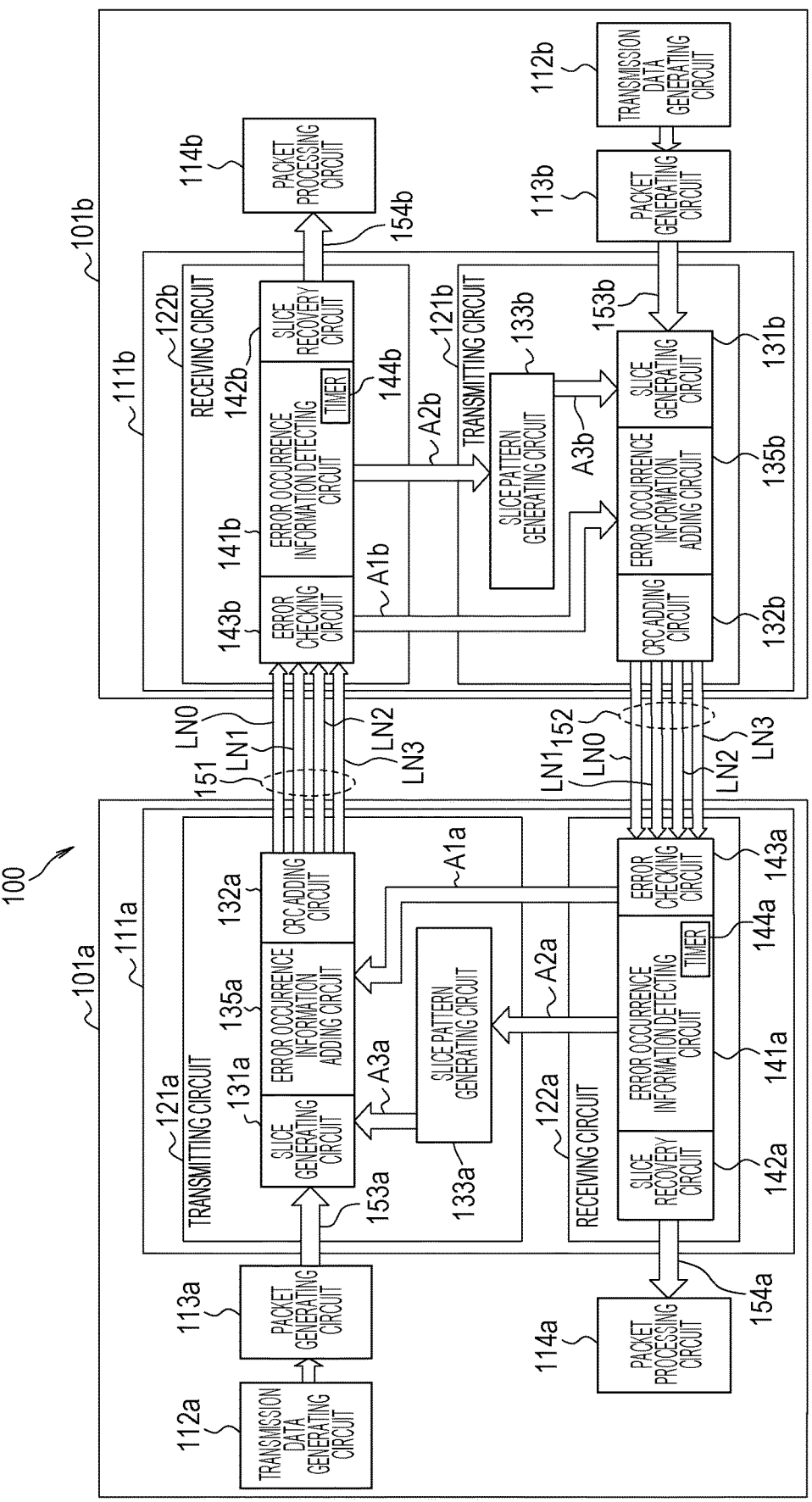
FIG. 5 is a diagram illustrating a configuration example of a transmission reception system according to a second embodiment.

FIG. 5 is a diagram illustrating a configuration example of the transmission reception system 100 according to a second embodiment. The semiconductor chip 101*a* in FIG. 5 includes both functions of the semiconductor chips 101*a* and 101*b* in FIG. 1. The semiconductor chip 101*b* in FIG. 5 also includes both functions of the semiconductor chips 101*a* and 101*b* in FIG. 1. The transmission reception system 100 includes the semiconductor chip 101*a*, the semiconductor chip 101*b*, the plurality of lanes LN0 to LN3 of the lane unit 151, and the plurality of lanes LN0 to LN3 of the lane unit 152. Hereinafter, differences of the present embodiment from the first embodiment will be described.

The semiconductor chip 101*a* includes the port 111*a*, the transmission data generating circuit 112*a*, the packet generating circuit 113*a*, and the packet processing circuit 114*a*. The port 111*a* includes the transmitting circuit 121*a* and the receiving circuit 122*a*. The transmitting circuit 121*a* includes an error occurrence information adding circuit 135*a* in addition to the slice generating circuit 131*a*, the CRC adding circuit 132*a*, and the slice pattern generating circuit 133*a*. The error occurrence information adding circuit 135*a* has the same function as the error occurrence information adding circuit 135*b* in FIG. 1. The receiving circuit 122*a* includes an error checking circuit 143*a* in addition to the error occurrence information detecting circuit 141*a* and the slice recovery circuit 142*a*. The error checking circuit 143*a* has the same function as the error checking circuit 143*b* in FIG. 1. The error occurrence information detecting circuit 141*a* includes the timer 144*a*.

The semiconductor chip 101*b* includes the port 111*b*, the transmission data generating circuit 112*b*, the packet generating circuit 113*b*, and the packet processing circuit 114*b*. The port 111*b* includes the transmitting circuit 121*b* and the receiving circuit 122*b*. The receiving circuit 122*b* includes an error occurrence information detecting circuit 141*b* in addition to the error checking circuit 143*b* and the slice recovery circuit 142*b*. The error occurrence information detecting circuit 141*b* includes a timer 144*b* and has the same function as the error occurrence information detecting circuit 141*a* in FIG. 1. The transmitting circuit 121*b* includes a slice pattern generating circuit 133*b* in addition to the slice generating circuit 131*b*, the error occurrence information adding circuit 135*b*, and the CRC adding circuit 132*b*. The slice pattern generating circuit 133*b* has the same function as the slice pattern generating circuit 133*a* in FIG. 1.

First, a transmission method of the semiconductor chip 101*a* will be described. The transmission data generating circuit 112*a* generates the transmission data and outputs the generated transmission data to the packet generating circuit 113*a*. The packet generating circuit 113*a* generates the packet 153*a* having a predetermined packet length based on the transmission data and outputs the generated packet 153*a* to the transmitting circuit 121*a*. In addition, the packet generating circuit 113*a* regularly generates the data link layer packet (DLLP) 153*a* and outputs the generated data link layer packet 153*a* to the transmitting circuit 121*a*.

The slice pattern generating circuit 133*a* inputs the error occurrence information A2*a* of 4 bits in the plurality of lanes LN0 to LN3 of the lane unit 151 from the error occurrence information detecting circuit 141*a*. The slice pattern generating circuit 133*a* selects one slice pattern among the six slice patterns illustrated in FIG. 2 based on the error occurrence information A2*a* and outputs the selected slice pattern number A3*a*. As illustrated in FIGS. 3A to 3C, the slice generating circuit 131*a* divides the packet 153*a* into the plurality of transmission blocks and distributes the plurality of transmission blocks to the lanes LN0 to LN3 of the lane unit 151 as the slice 302 based on the slice pattern number A3*a*. The slice generating circuit 131*a* adds the slice pattern number A3*a* to the header 301 at the head of the slice 302 for each of the four lanes LN0 to LN3 of the lane unit 151.

The error occurrence information adding circuit 135*a* inputs error occurrence information A1*a* of 4 bits in the plurality of lanes LN0 to LN3 of the lane unit 152 from the error checking circuit 143*a*. As illustrated in FIGS. 3A to 3C, the error occurrence information adding circuit 135*a* adds the error occurrence information A1*a* to the header 301 at the head of the slice 302 for each of the four lanes LN0 to LN3 of the lane unit 151. As illustrated in FIGS. 3A to 3C, the CRC adding circuit 132*a* adds the CRC information 303 to the end of the slice 302 of each of the four lanes LN0 to LN3 of the lane unit 151. The transmitting circuit 121*a* transmits the slice 302 to which the header 301 and the CRC information 303 are added, to the semiconductor chip 101*b* via the plurality of lanes LN0 to LN3 of the lane unit 151.

Next, a reception method of the semiconductor chip 101*b* will be described. The receiving circuit 122*b* receives the slice 302 to which the header 301 and the CRC information 303 are added, from the semiconductor chip 101*a* via the plurality of lanes LN0 to LN3 of the lane unit 151. The receiving circuit 122*b* receives the same header 301 from each of the plurality of lanes LN0 to LN3 of the lane unit 151. The error checking circuit 143*b* calculates the error occurrence frequency of the header 301 and the slice 302 of each of the plurality of lanes LN0 to LN3 of the lane unit 151 based on the CRC information 303, for each of the plurality of lanes LN0 to LN3 of the lane unit 151. Then, the error checking circuit 143*b* generates the error occurrence information A1*b* of the plurality of lanes LN0 to LN3 of the lane unit 151 based on the error occurrence frequency of each of the plurality of lanes LN0 to LN3 of the lane unit 151 and outputs the error occurrence information A1*b* of 4 bits to the error occurrence information adding circuit 135*b*.

The error occurrence information detecting circuit 141*b* detects the error occurrence information A1*a* in the received header 301 and outputs the detected error occurrence information A1*a* to the slice pattern generating circuit 133*b* as error occurrence information A1*b*. The slice recovery circuit 142*b* recovers the packet 154*b* by combining the plurality of reception blocks in the received slice 302 based on the slice pattern number A3*a* in the received header 301 and outputs the packet 154*b* to the packet processing circuit 114*b*. The packet processing circuit 114*b* performs the process on the packet 154*b*.

Next, a transmission method of the semiconductor chip 101*b* will be described. The transmission data generating circuit 112*b* generates the transmission data and outputs the generated transmission data to the packet generating circuit 113*b*. The packet generating circuit 113*b* generates the packet 153*b* having a predetermined packet length based on the transmission data and outputs the generated packet 153*b* to the transmitting circuit 121*b*. In addition, the packet generating circuit 113*b* regularly generates the data link layer packet (DLLP) 153*b* and outputs the generated data link layer packet 153*b* to the transmitting circuit 121*b*.

The slice pattern generating circuit 133*b* inputs the error occurrence information A2*b* of 4 bits in the plurality of lanes LN0 to LN3 of the lane unit 152 from the error occurrence information detecting circuit 141*b*. The slice pattern generating circuit 133*b* selects the one slice pattern among the six slice patterns illustrated in FIG. 2 based on the error occurrence information A2*b* and outputs a selected slice pattern number A3*b*. In the same manner as FIGS. 3A to 3C, the slice generating circuit 131*a* divides the packet 153*b* into the plurality of transmission blocks and distributes the plurality of transmission blocks to the lanes LN0 to LN3 of the lane unit 152 as the slice 302 based on the slice pattern number A3*b*. The slice generating circuit 131*b* adds the slice pattern number A3*b* to the header 301 at the head of the slice 302 for each of the four lanes LN0 to LN3 of the lane unit 152.

The error occurrence information adding circuit 135*b* inputs the error occurrence information A1*b* of 4 bits in the plurality of lanes LN0 to LN3 of the lane unit 151 from the error checking circuit 143*b*. In the same manner as FIGS. 3A to 3C, the error occurrence information adding circuit 135*b* adds the error occurrence information A1*b* to the header 301 at the head of the slice 302 for each of the four lanes LN0 to LN3 of the lane unit 152. In the same manner as FIGS. 3A to 3C, the CRC adding circuit 132*b* adds the CRC information 303 to the end of the slice 302 of each of the four lanes LN0 to LN3 of the lane unit 152. The transmitting circuit 121*b* transmits the slice 302 to which the header 301 and the CRC information 303 are added, to the semiconductor chip 101*a* via the plurality of lanes LN0 to LN3 of the lane unit 152.

Next, a reception method of the semiconductor chip 101*a* will be described. The receiving circuit 122*a* receives the slice 302 to which the header 301 and the CRC information 303 are added, from the semiconductor chip 101*b* via the plurality of lanes LN0 to LN3 of the lane unit 152. The error checking circuit 143*a* calculates the error occurrence frequency of the header 301 and the slice 302 of each of the plurality of lanes LN0 to LN3 of the lane unit 152 based on the CRC information 303, for each of the plurality of lanes LN0 to LN3 of the lane unit 152. Then, the error checking circuit 143*a* generates the error occurrence information A1*a* of the plurality of lanes LN0 to LN3 of the lane unit 152 based on the error occurrence frequency of each of the plurality of lanes LN0 to LN3 of the lane unit 152 and outputs the error occurrence information A1a of 4 bits to the error occurrence information adding circuit 135a.

The error occurrence information detecting circuit 141a detects the error occurrence information A1b in the received header 301 and outputs the detected error occurrence information A1b to the slice pattern generating circuit 133a as error occurrence information Ata. The slice recovery circuit 142a recovers the packet 154a by combining the plurality of reception blocks in the received slice 302 based on the slice pattern number A3b in the received header 301 and outputs the packet 154a to the packet processing circuit 114a. The packet processing circuit 114a performs the process on the packet 154a.

Next, a case where the receiving circuit 122a may not receive the error occurrence information A1b in the header 301 due to a transmission error of all of the lanes LN0 to LN3 of the lane unit 152 will be described. The error occurrence information A1b is error occurrence information of the lanes LN0 to LN3 of the lane unit 151. The packet generating circuit 113b regularly outputs the data link layer packet (DLLP) to the transmitting circuit 121b. The error occurrence information detecting circuit 141a measures the interval at which the receiving circuit 122a receives the packet from the plurality of lanes LN0 to LN3 of the lane unit 152, by the timer 144a. In a case where the interval at which the receiving circuit 122a receives the packet from the plurality of lanes LN0 to LN3 of the lane unit 152, is equal to or larger than a threshold value, the error occurrence information detecting circuit 141a notifies the slice pattern generating circuit 133a that the error occurrence information may not be detected. Then, the slice pattern generating circuit 133a decreases the currently selected slice pattern number A3a in order. Specifically, as illustrated in FIG. 2, the slice pattern generating circuit 133a changes the slice pattern number A3a in order of 0→1→2→5→6→7. Accordingly, there is a high possibility that the receiving circuit 122b may normally receive all of the reception blocks and it is possible to recover the packet.

Next, a case where the receiving circuit 122b may not receive the error occurrence information A1a in the header 301 due to the transmission error of all of the lanes LN0 to LN3 of the lane unit 151 will be described. The error occurrence information A1a is error occurrence information of the lanes LN0 to LN3 of the lane unit 152. The packet generating circuit 113a regularly outputs the data link layer packet (DLLP) to the transmitting circuit 121a. The error occurrence information detecting circuit 141b measures the interval at which the receiving circuit 122b receives the packet from the plurality of lanes LN0 to LN3 of the lane unit 151, by the timer 144b. In a case where the interval at which the receiving circuit 122b receives the packet from the plurality of lanes LN0 to LN3 of the lane unit 151, is equal to or larger than a threshold value, the error occurrence information detecting circuit 141b notifies the slice pattern generating circuit 133b that the error occurrence information may not be detected. Then, the slice pattern generating circuit 133b decreases the currently selected slice pattern number A3b in order. Specifically, as illustrated in FIG. 2, the slice pattern generating circuit 133b changes the slice pattern number A3b in order of 0→1→2→5→6→7. Accordingly, there is a high possibility that the receiving circuit 122a may normally receive all of the reception blocks and it is possible to recover the packet.

Next, an effect of the transmission reception system 100 will be described. In a case where the error occurrence frequency of the lanes LN0 to LN3 of the lane unit 151 is equal to or larger than a threshold value, the semiconductor chip 101b adds the error occurrence information A1b to the slice 302 in the packet and transmits the slice 302. The semiconductor chip 101a adds the slice pattern number A3a to the slice 302 in the packet and transmits the slice 302. The semiconductor chips 101a and 101b may change the slice pattern number A3a while the semiconductor chips 101a and 101b transmits and receives the slice 302 of the packet. Accordingly, when changing the slice pattern number A3a, the semiconductor chips 101a and 101b do not desirable to interrupt transmitting or receiving the slice 302 of the packet.

In addition, in a case where the error occurrence frequency of the lanes LN0 to LN3 of the lane unit 151 is equal to or larger than the threshold value, the semiconductor chip 101b transmits the error occurrence information A1b to the semiconductor chip 101a. Here, it is considered that the semiconductor chip 101b waits for a response from the semiconductor chip 101a and changes the slice pattern number of both of the lane units 151 and 152. In this case, when both of the error occurrence frequency of the lane unit 151 and the error occurrence frequency of the lane unit 152 are equal to or larger than the threshold value, there is a problem that each of the semiconductor chips 101a and 101b continues to transmit the error occurrence information and becomes a deadlock without obtaining the response. According to the present embodiment, the semiconductor chips 101a and 101b change the slice pattern number without waiting for the response. Since the slice pattern number A3a of the lanes LN0 to LN3 of the lane unit 151 and the slice pattern number A3b of the lanes LN0 to LN3 of the lane unit 152 are changed independently, it is possible to reduce the deadlock.

In addition, in a case where the interval at which the receiving circuit 122b receives the packet from the plurality of lanes LN0 to LN3 of the lane unit 151, is equal to or larger than a threshold value, the error occurrence information detecting circuit 141b notifies the slice pattern generating circuit 133b that the error occurrence information may not be detected. Then, the slice pattern generating circuit 133b decreases the currently selected slice pattern number A3b in order. Accordingly, there is a high possibility that the receiving circuit 122a may normally receive all of the reception blocks and it is possible to recover the packet.

In addition, the transmission reception system 100 may correspond to an intermittent transmission error (noise or the like) and a permanent transmission error (disconnection of lanes LN0 to LN3 or the like). In some cases, a quality of the transmission of the lanes LN0 to LN3 may be recovered after the transmission quality deteriorates for a certain period. Specifically, a case where the lanes LN0 to LN3 are optical cables is remarkable. That is, the error occurrence frequency and the error occurrence information A1a and A1b are changed. In a case where the number of the bits of one among the error occurrence information A2a and A2b increases, the slice pattern generating circuits 133a and 133b are changed to have the slice pattern number having a small number of times being distributed, the receiving circuits 122a and 122b may receive all of the reception blocks constituting the packet. In addition, in a case where the number of the bits of one among the error occurrence information A2a and A2b decreases, the slice pattern generating circuits 133a and 133b are changed to have the slice pattern number having a large number of times being distributed, the receiving circuits 122a and 122b may have a high reception speed.

In addition, in the transmission reception system 100, since it is possible to change the slice pattern number for each of the lane units 151 and 152, it is possible to change the slice pattern number of only the lane unit having the high error occurrence frequency. Further, in the transmission reception system 100, since the error checking circuits 143a and 143b continue to update the error occurrence information A1a and A1b by checking the error, it is possible to change the slice pattern number for each of the packets. Accordingly, it is possible to relieve the lane with a poor transmission quality and in a case where the transmission quality improves as time elapses, it is possible to return the slice pattern number to number 0. This operation is also performed without interrupting communication of the slice 302 of the packet. According to the present embodiment, it is possible to reduce the reception error of the semiconductor chip 101b which receives the packet from the semiconductor chip 101a via the plurality of lanes LN0 to LN3 of the lane unit 151 and it is possible to reduce the reception error of the semiconductor chip 101a which receives the packet from the semiconductor chip 101b via the plurality of lanes LN0 to LN3 of the lane unit 152.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device comprising:
    a receiver configured to receive availability information of each of a plurality of first transmission paths; and
    a transmitter configured to
    divide data into a plurality of transmission blocks,
    when the availability information indicates that each of the plurality of first transmission paths has an error occurrence below a threshold value, transmit a different one of the plurality of transmission blocks to each of the plurality of first transmission paths, and
    when the availability information indicates that one of the plurality of first transmission paths has an error occurrence above the threshold value and another one of the plurality of first transmission paths has an error occurrence below the threshold value, transmit the same transmission block from among the plurality of transmission blocks to both the one of the plurality of first transmission path that has an error occurrence above the threshold value and the another one of the plurality of first transmission paths that has an error occurrence below the threshold value.

2. The transmission device according to claim 1, wherein the receiver is further configured to receive availability information from each of a plurality of second transmission paths.

3. The transmission device according to claim 1, wherein the transmitter is further configured to group the plurality of transmission blocks into a plurality of slices, each of the plurality of slices include a distinct subset of the plurality of transmission blocks, and transmit information indicating the transmission blocks included in each of the plurality of slices, and the transmission blocks are configured to be transmitted in the each of the plurality of the slice.

4. The transmission device according to claim 1, wherein the transmitter transmits information indicating a method of the distribution to each of the plurality of first transmission paths.

5. The transmission device according to claim 1, wherein the receiver receives a plurality of reception blocks from the plurality of second transmission paths and generates the availability information of each of the plurality of second transmission paths based on an error occurrence frequency of each of the plurality of second transmission paths, and
the transmitter transmits the availability information of each of the plurality of second transmission paths to each of the plurality of first transmission paths.

6. The transmission device according to claim 1, wherein the transmitter transmits error checking information of the transmission block to be transmitted, to each of the plurality of first transmission paths, and
the receiver receives the error checking information from each of the plurality of second transmission paths and calculates the error occurrence frequency of each of the plurality of second transmission paths based on the error checking information.

7. The transmission device according to claim 1, wherein the receiver receives the information indicating the method of distributing the plurality of reception blocks to the plurality of second transmission paths, from each of the plurality of second transmission paths and recovers the data by combining the plurality of reception blocks based on the received information indicating the method of the distribution.

8. The transmission device according to claim 1, wherein the transmitter adds the availability information of each of the plurality of second transmission paths to the distributed transmission block and transmits the transmission block to each of the plurality of first transmission paths.

9. The transmission device according to claim 1, further comprising
a packet output circuit configured to regularly output a data link layer packet to the transmitter as the data, wherein
in a case where an interval at which the receiver receives the data from the plurality of second transmission paths is equal to or larger than a threshold value, the transmitter increases the number of first transmission paths each of which transmits a same transmission block as another first transmission path among the plurality of first transmission paths.

10. A transmission reception system comprising:
a transmission device, including
    a first receiver configured to receive availability information of each of a plurality of first transmission paths from a reception device via each of a plurality of second transmission paths, and
    a first transmitter configured to divide data into a plurality of transmission blocks,
    when the availability information indicates that each of the plurality of first transmission paths has an error occurrence below a threshold value, transmitting a different one of the plurality of transmission blocks to each of the plurality of first transmission paths, and
    when the availability information indicates that one of the plurality of first transmission paths has an error occurrence above the threshold value and another one of the plurality of first transmission paths has an error occurrence below the threshold value, transmitting the same transmission block from among the plurality of transmission blocks to both the one of the plurality of first transmission path that has an error occurrence above the threshold value and the another one of the plurality of first transmission paths that has an error occurrence below the threshold value; and the reception device including a second receiver configured to receive the plurality of transmission blocks from the plurality of first transmission paths and generating the availability information of each of the plurality of first transmission paths based on an error occurrence frequency of each of the plurality of first transmission paths, and a second transmitter configured to transmit the availability information of each of the plurality of first transmission paths to each of the plurality of second transmission paths.

11. The transmission reception system according to claim 10, wherein the first transmitter transmits error checking information of the transmission block to be transmitted, to each of the plurality of first transmission paths, and the second receiver receives the error checking information from each of the plurality of first transmission paths and calculates the error occurrence frequency of each of the plurality of first transmission paths based on the error checking information.

12. The transmission reception system according to claim 10, wherein the first transmitter transmits information indicating a method of the distribution to each of the plurality of first transmission paths, and the second receiver receives the information indicating the method of the distribution from each of the plurality of first transmission paths and recovers the data by combining the plurality of transmission blocks based on the information indicating the method of the distribution.

13. The transmission reception system according to claim 10, wherein the second transmitter divides the data into a plurality of blocks, distributes the plurality of blocks to the plurality of second transmission paths, adds the availability information of each of the plurality of first transmission paths to each of the distributed blocks, and transmits the block to each of the plurality of second transmission paths.

14. The transmission reception system according to claim 10, wherein the reception device includes a packet output circuit configured to regularly output a data link layer packet to the second transmitting circuit as the data, and in a case where an interval at which the first receiver receives the data from the plurality of second transmission paths is equal to or larger than a threshold value, the first transmitter increases the number of first transmission paths each of which transmits a same block as another first transmission path among the plurality of first transmission paths.

15. A control method for a transmission reception system including a transmission device and a reception device, the method comprising:

receiving, by a first receiver in the transmission device, availability information of each of a plurality of first transmission paths from the reception device via each of a plurality of second transmission paths;

dividing, by a first transmitter in the transmission device, data into a plurality of transmission blocks;

when the availability information indicates that each of the plurality of first transmission paths has an error occurrence below a threshold value, transmitting a different one of the plurality of transmission blocks to each of the plurality of first transmission paths, and when the availability information indicates that one of the plurality of first transmission paths has an error occurrence above the threshold value and another one of the plurality of first transmission paths has an error occurrence below the threshold value, transmitting the same transmission block from among the plurality of transmission blocks to both the one of the plurality of first transmission path that has an error occurrence above the threshold value and the another one of the plurality of first transmission paths that has an error occurrence below the threshold value;

receiving, by a second receiver in the reception device, the plurality of transmission blocks from the plurality of first transmission paths;

generating, by the second receiver in the reception device, the availability information of each of the plurality of first transmission paths based on an error occurrence frequency of each of the plurality of first transmission paths; and transmitting, by a second transmitter in the reception device, the availability information of each of the plurality of first transmission paths to each of the plurality of second transmission paths.

* * * * *